(12) United States Patent  
Balz et al.

(10) Patent No.: US 6,540,081 B2
(45) Date of Patent: Apr. 1, 2003

(54) UNIT DOSE BLISTER PACK PRODUCT DISPENSER

(75) Inventors: Eric R. Balz, Stillwater, MN (US); Joshua J. Lanz, North Branch, MN (US)

(73) Assignee: Ecolab Inc., St. Paul, MN (US)

( * ) Notice: Subject to any disclaimer, the term of this patent is extended or adjusted under 35 U.S.C. 154(b) by 23 days.

(21) Appl. No.: 09/948,167

(22) Filed: Sep. 6, 2001

(65) Prior Publication Data

US 2003/0042167 A1 Mar. 6, 2003

(51) Int. Cl.[7] .............................................. B65D 83/04
(52) U.S. Cl. ......................................... 206/531; 206/538
(58) Field of Search ................................. 206/531, 538, 206/539, 528, 533, 534.1, 534.2, 485, 485.1; 221/303

(56) References Cited

U.S. PATENT DOCUMENTS

| | | | |
|---|---|---|---|
| 4,405,060 A | 9/1983 | Hsei ........................... | 221/135 |
| 5,035,237 A * | 7/1991 | Newell et al. ............ | 128/203.15 |
| 5,348,158 A | 9/1994 | Honan et al. ................ | 206/531 |
| 5,489,025 A | 2/1996 | Romick ....................... | 206/531 |
| 6,155,424 A * | 12/2000 | Dubach ....................... | 206/531 |

FOREIGN PATENT DOCUMENTS

| | | | | |
|---|---|---|---|---|
| DE | 3832049 A1 | * | 3/1990 | ........... B65D/83/04 |
| DE | 3838144 A1 | * | 5/1990 | ........... B65D/83/04 |
| EP | 0 903 405 A2 | | 3/1999 | |

* cited by examiner

*Primary Examiner*—Mickey Yu
*Assistant Examiner*—J. Gregory Pickett
(74) *Attorney, Agent, or Firm*—IPLM Group, P.A.

(57) ABSTRACT

The present invention relates to a reusable dispenser (10) for dispensing a unit dose of a solid product contained in a disposable blister pack (25). The dispenser (10) includes a housing (11), a back plate (30), and a dispensing tray (40). The blister pack (25) containing product is positioned between the housing (11) and the back plate (30), and the product is dispensed through the back plate (30) into the dispensing tray (40) where it can be acquired for use. A puncture tab (35) is integrated into the back plate (30) for aiding in rupturing the backing (28) of the blister pack (25) to dispense the product more easily.

14 Claims, 4 Drawing Sheets

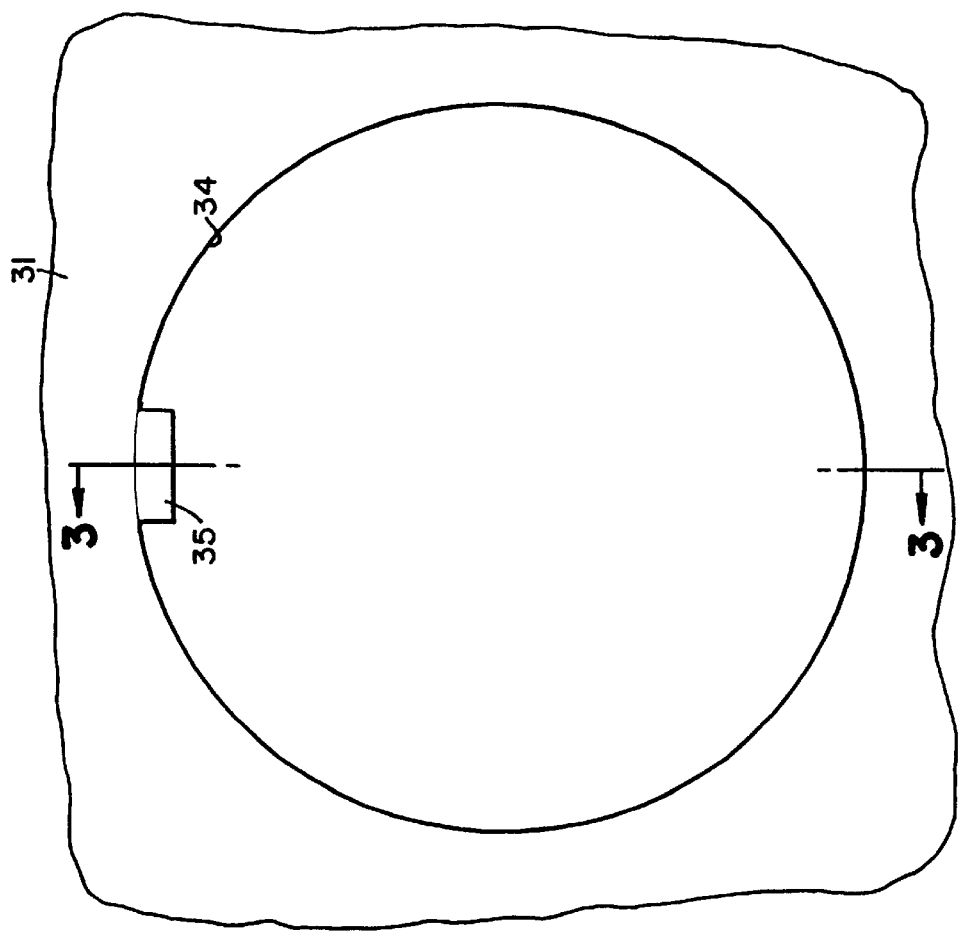

UNIT DOSE BLISTER PACK PRODUCT DISPENSER

BACKGROUND OF THE INVENTION

1. Field of the Invention

The present invention relates to a reusable dispenser for dispensing a unit dose of product contained in a blister pack.

2. Description of the Prior Art

The use of dispensers for dispensing medication from blister packs is known. For example, U.S. Pat. No. 5,348,158 by Honan et al. discloses a reusable dispensing package for the successive dispensing of medication in the form of tablets, pills, capsules or the like, in a predetermined sequence. The package includes a hinged container into which is placed a disposable blister pack containing the medication. The container has a spring-loaded button or plunger attached thereto which is moved around a track in the cover of the dispenser and when depressed releases a tablet or a pill contained in the blister pack in the predetermined sequence.

U.S. Pat. No. 5,489,025 by Romick discloses a medication dispenser for dispensing unit doses of medication from a blister pack. The dispenser includes a top plate and a bottom plate. The top plate has a face area and a back area with at least one aperture for receiving a blister of a blister pack. The back plate is adapted to engage the back area of the top plate to confine the blister pack between the top plate and the bottom plate. The bottom plate has at least one dispensing aperture in register with the blister of the blister pack. One or more of the medication dispensers can be held in a frame which confines the dispensers between side walls having bosses which cooperate with retaining tabs on the medication dispensers to retain the dispensers within the frame.

Although these patents disclose dispensers for dispensing medication from a blister pack, these dispensers would not facilitate the dispensing of a larger tablet such as a solid detergent tablet. For example, Sudafed® tablets are relatively small and are contained in a blister pack, and the foil backing of the blister pack has a small surface area, and therefore, it is relatively easy to tear the foil backing with the tablet. However, this is very difficult with a large product tablet and a backing having a large surface area because when the product is pushed against the backing, the backing does not easily tear without using much greater force to initiate the tear.

In the commercial use of products such as detergents, using the correct dose of a product can be very important. Providing products in unit doses can be very beneficial in controlling the amount of product used, and one way in which this can be accomplished is to package the unit dose products in a blister pack. This, permits the handling of only a single dose of product at a time and prevents the other individually contained product tablets from becoming exposed to various environmental conditions such as hot, humid environments in areas including basements, storage closets, kitchens, and laundry rooms when one of the product tablets is dispensed. It is important that the product tablets not be exposed because this may damage the product tablets. However, because of the size of the product tablets, it may be difficult to dispense the tablet from the blister pack. Therefore, using a dispenser having tear-initiating means is necessary to more easily dispense the product tablets from the blister pack, and this is not known.

SUMMARY OF THE INVENTION

In a preferred embodiment dispenser for dispensing a solid product tablet having a first size, a blister pack has a compartment containing the solid product tablet. The compartment has a top portion, a bottom portion, an opening, and a second size. The second size is larger than the first size of the solid product tablet. A housing has a cup member and a first aperture. The cup member cups a lower portion of the first aperture, and the compartment is configured and arranged to protrude through the first aperture. The cup member protects the bottom portion of the compartment and allows access to the top portion of the compartment. A back plate has a second aperture and a puncture tab, and the back plate is configured and arranged to fit within the housing. The second aperture is in alignment with the first aperture, and the puncture tab extends from the back plate into the second aperture, wherein the blister pack is positioned between the housing and the back plate. A tray has a bottom, and the tray is operatively connected to the back plate, wherein the tray allows the solid product tablet to be dispensed through the second aperture and proximate the bottom of the tray.

In a preferred method of dispensing a solid product tablet having a first size, a blister pack having a backing and a compartment containing the solid product tablet is placed between a housing and a back plate. The compartment has a top portion, a bottom portion, an opening, and a second size. The backing seals the opening of the compartment, and the second size is larger than the first size of the solid product tablet. The housing has a cup member and a first aperture. The cup member cups a lower portion of the first aperture, and the compartment protrudes through the first aperture. The cup member protects the bottom portion of the compartment and allows access to the top portion of the compartment. The back plate has a second aperture and a puncture tab. The back plate fits within the housing, and the second aperture is in alignment with the first aperture. The puncture tab extends from the back plate into the second aperture, wherein the blister pack is positioned between the housing and the back plate. A tray has a bottom and is operatively connected to the back plate, wherein the tray allows the solid product tablet to be dispensed proximate the bottom of the tray. When the top portion of the compartment is pushed, the puncture tab pierces the backing of the blister pack thereby allowing the solid product tablet to exit the compartment through the opening and the second aperture, wherein the solid product tablet falls to the bottom of the tray.

In a preferred embodiment dispenser for dispensing a solid product tablet having a first size from a blister pack having a compartment containing the solid product tablet, the compartment has a top portion, a bottom portion, and a second size. The second size is larger than the first size of the solid product tablet. A housing has a cup member and a first aperture, and the first aperture is configured and arranged to accommodate the compartment of the blister pack. The cup member protects the bottom portion of the compartment and allows access to the top portion of the compartment. A back plate has a second aperture and a puncture tab, and the back plate fits within the housing wherein the blister pack is positioned between the housing and the back plate. The puncture tab extends from the back plate into the second aperture. A tray has a bottom and is operatively connected to the back plate wherein the tray allows the solid product tablet to be dispensed proximate the bottom of the tray.

In a preferred embodiment dispenser for dispensing a solid product tablet having a first size from a blister pack having a compartment containing the solid product tablet, the compartment has a top portion, a bottom portion, and a second size. The second size is larger than the first size of the solid product tablet. A housing has a cup member and a first aperture. The cup member cups a lower portion of the first aperture, and the compartment is configured and arranged to protrude through the first aperture. The cup member protects the bottom portion of the compartment and allows access to the top portion of the compartment. A back plate has a second aperture, and the back plate is configured and arranged to fit within the housing. The second aperture is in alignment with the first aperture, and the blister pack is positioned between the housing and the back plate. A puncture tab extends from the back plate into the second aperture.

In another preferred embodiment dispenser for dispensing a solid product tablet having a first size, a blister pack has a compartment containing the solid product tablet. The compartment has a top portion, a bottom portion, and a second size. The second size is larger than the first size of the solid product tablet. A housing has a cup member and a first aperture, and the cup member cups a lower portion of the first aperture. The compartment is configured and arranged to protrude through the first aperture. The cup member protects the bottom portion of the compartment and allows access to the top portion of the compartment. A back plate has a second aperture, and the back plate is configured and arranged to fit within the housing. The second aperture is in alignment with the first aperture, and the blister pack is positioned between the housing and the back plate. A puncture tab extends from the back plate into the second aperture. A tray has a bottom and is operatively connected to the back plate, and the tray allows the solid product tablet to be dispensed proximate the bottom of the tray.

BRIEF DESCRIPTION OF THE DRAWINGS

FIG. 2 is a cut-away front view of a back plate having a puncture tab of the dispenser shown in FIG. 1;

FIG. 3 is a sectional view of the back plate taken along the lines 3—3 in FIG. 2;

DETAILED DESCRIPTION OF THE PREFERRED EMBODIMENT

Figure 1:
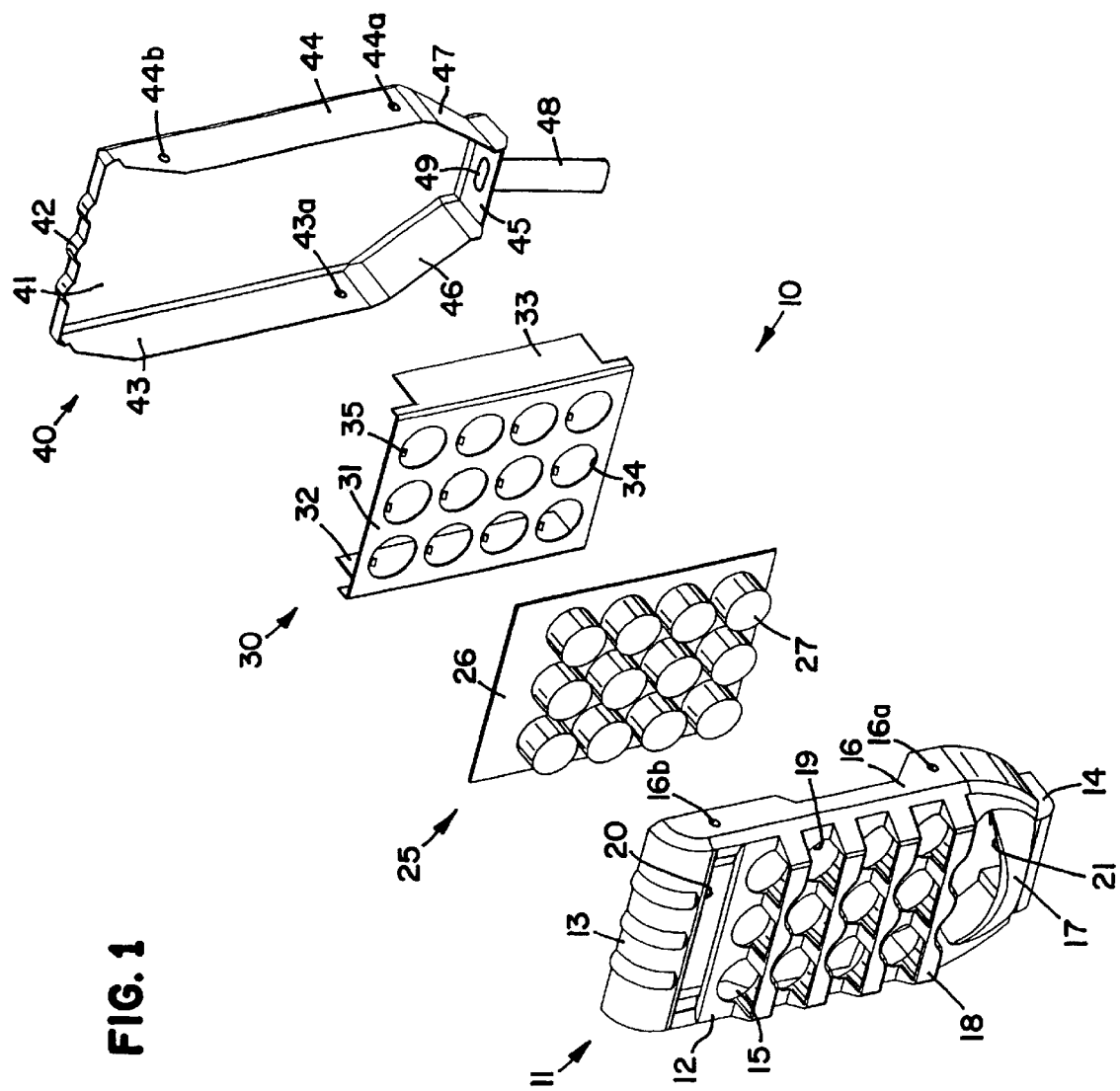
FIG. 1 is an exploded perspective view of a dispenser for dispensing a blister pack containing a product.

A preferred embodiment reusable dispenser constructed according to the principles of the present invention is designated by the numeral 10 in FIG. 1.

Figure 4:
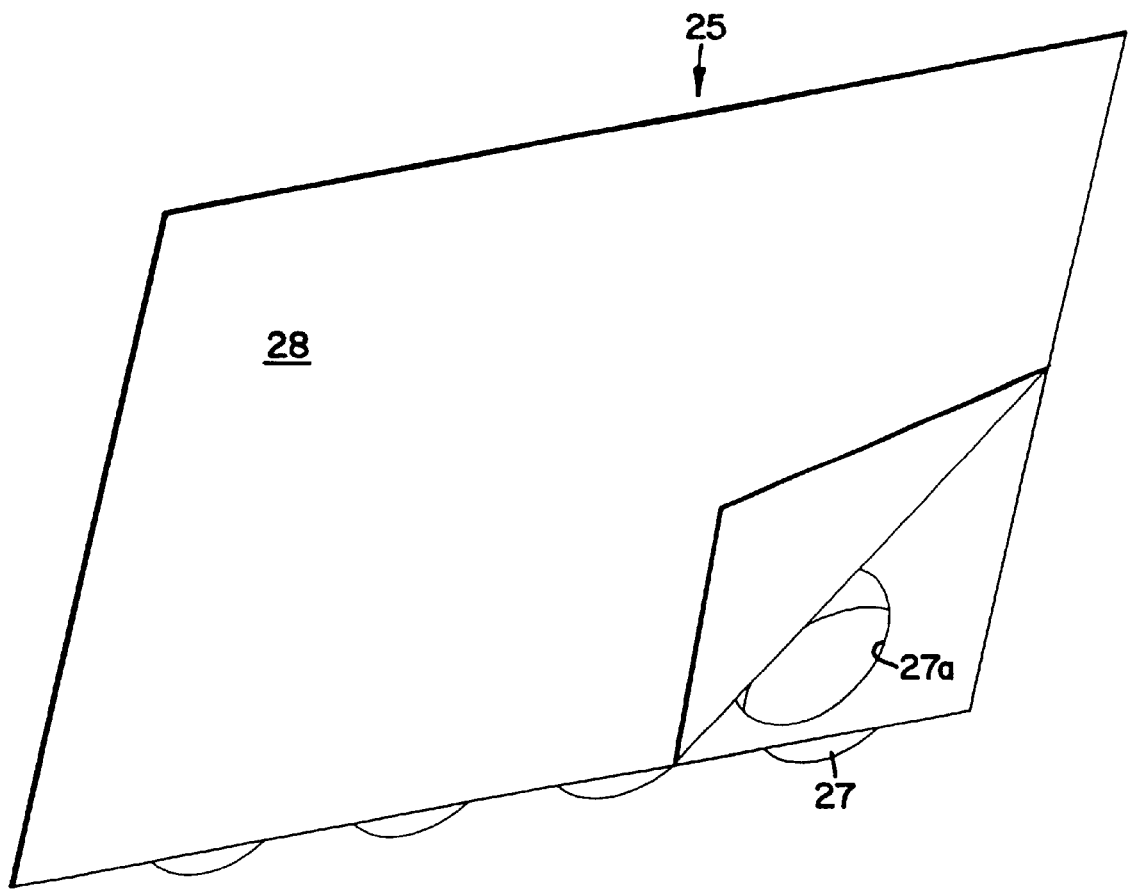
FIG. 4 is a perspective view of a blister pack for use with the dispenser shown in FIG. 1.

The reusable dispenser 10 is used for individually dispensing solid product tablets in a unit dose contained in a disposable blister pack 25 and includes a housing 11, a back plate 30 and a dispensing tray 40. The disposable blister pack 25, which contains the solid product tablets (not shown), includes a plastic portion 26 and a backing 28 as shown in FIG. 4. The plastic portion 26 has a plurality of blisters or compartments 27 that each accommodate a unit dose of a solid product tablet, and each of the compartments 27 is individually sealed by the backing 28. The compartments 27 are an integral part of the plastic portion 26. Each compartment 27 essentially protrudes from the front of the plastic portion 26 and leaves an opening 27a in the back of the plastic portion 26 through which a product tablet may be placed in the compartment 27. Therefore, the openings 27a of the compartments 27 must each be individually sealed to protect each product tablet independently, and the backing 28 serves this function by sealing each compartment 27 around its opening 27a on the back of the plastic portion 26. This permits the handling of only a single dose of product at a time and prevents the other individually sealed product tablets from becoming exposed to various environmental conditions such as hot, humid environments in areas including basements, storage closets, kitchens, and laundry rooms when one of the product tablets is dispensed. It is important that the product tablets not be exposed because this may damage the product tablets. The backing 28 of the disposable blister pack 25 is typically made of a single piece of foil laminate that spans the back of the plastic portion 26 and effectively seals each of the openings 27a of the compartments 27. The blister pack 25 is well known in the art for providing product packaging that allows for simplistic dispensing of one product tablet at a time.

Figure 5:
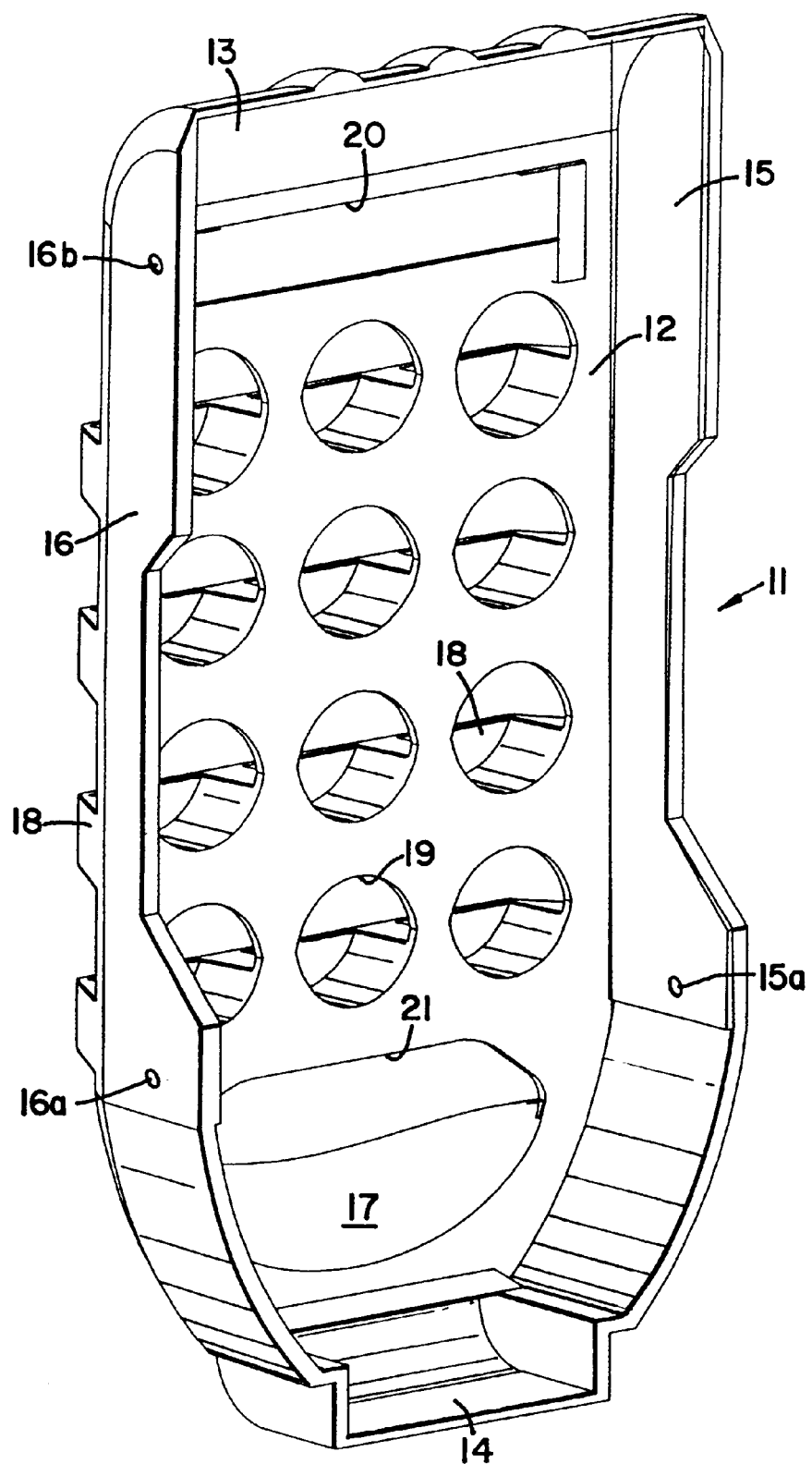
FIG. 5 is a rear view of a housing of the dispenser shown in FIG. 1.

In the preferred embodiment, the housing 11 is a cover-like component of the reusable dispenser 10. The housing 11 is shown in FIGS. 1 and 5. A face 12 forms a four-sided, rectangular front portion of the housing 11 and includes a plurality of cup members 18 and a plurality of corresponding apertures 19. The cup members 18 protrude in an outward direction from the surface of the face 12 around the lower bottom portions of the apertures 19 and are not enclosed at the top. Therefore, the upper portions of apertures 19 are exposed above the cup members 18 and the cup members 18 protect the lower portions of the apertures. In other words, the cup members 18 essentially cup the bottom portions of the apertures 19. The face 12 also includes a receptacle 17 having an opening 21 and a window 20. The receptacle 17 is located proximate the bottom of the face 12 and provides a bin for receiving the product tablet after it has been dispensed from the blister pack 25, and opening 21 allows the dispensed product tablet to be acquired from the receptacle 17. A top 13, a bottom 14, a first side 15, and a second side 16 are each operatively connected to one of the four edges of the face 12 and protrude in an inward direction to serve as lips of the housing 11. More specifically, the top 13 is operatively connected to the top of face 12, the bottom 14 is operatively connected to the bottom of face 12, the first side 15 is operatively connected to the left side of face 12 and to the left edges of the top 13 and the bottom 14, and the second side 16 is operatively connected to the right side of face 12 and to the right edges of the top 13 and the bottom 14. The first side 15 includes a hole 15a proximate the bottom, and the second side 16 includes a hole 16a proximate the bottom and a hole 16b proximate the top. The housing 11 is configured and arranged to cooperate with the back plate 30 and the dispensing tray 40.

The back plate 30 is a generally U-shaped component including a front 31, a first side 32, and a second side 33. The front 31 is a flat, rectangular portion, and the first side 32 is operatively connected to the left side of the front 31 and the second side 33 is operatively connected to the right side of the front 31. The first side 32 and the second side 33 extend in an inward direction away from the front 31. The back plate 30 is configured and arranged to fit within the housing 11. When the housing 11 is placed over the back plate 30 without a blister pack 25 being positioned in between these two components, the corresponding portions of the back plate 30 contact corresponding portions of the housing 11. In other words, the front 31 contacts the back surface of face 12, the first side 32 contacts the first side 15, and the second side 33 contacts the second side 16. In addition, the front 31 includes a plurality of apertures 34, which are approximately 1.625 inches in diameter. The apertures 34 are in alignment with the apertures 19 when the housing 11 and the back plate 30 are assembled. These apertures may be made smaller or larger depending upon the size of the product tablet used with the dispenser. In addition, a plurality of tear-initiating puncture tabs 35 are operatively connected to the back plate 30. In the preferred embodiment, the puncture tabs 35 are operatively connected to the back side of the back plate 30 proximate the top of each aperture 34 and extend slightly into each aperture 34. The puncture tabs 35 are approximately 0.250 inches wide and extend into the apertures 34 approximately 0.125 inches at an angle of approximately 45 degrees. This is shown in greater detail in FIGS. 2 and 3.

In the preferred embodiment, a dispensing tray 40 is also included in the dispenser 10 to direct the dispensed product tablets into the receptacle 17 so they may be acquired through the opening 21. The tray 40 not only encloses the back of the dispenser 10 but it also provides means for the dispenser 10 to be mounted on a surface such as a wall. A back portion 41 is the major component of the tray 40, and the back portion 41 is generally rectangular but the two side portions taper downward near the bottom ends toward the bottom portion. Therefore, the back portion 41 is six-sided but has a generally rectangular shape. The back portion 41 may also be a true rectangular shape as long as it allows easy access to the dispensed product tablets in the receptacle 17. The top 42 of back portion 41 does not include an edge or lip extending therefrom but the other sides of the back portion 41 include edges or lips. A first side 43 extends in an outward direction from the left side of the back portion 41 and a second side 44 extends in an outward direction from the right side of the back portion 41. The first side 43 includes a hole 43a proximate the bottom, and the second side 44 includes a hole 44a proximate the bottom and a hole 44b proximate the top. Also, a bottom 45 extends in an outward direction from the bottom of the back portion 41. A third side 46 extends from the side of the back portion 41 between the first side 43 and the bottom 45, and a fourth side 47 extends from the side of the back portion 41 between the second side 44 and the bottom 45. Therefore, the dispensing tray 40 resembles a pan absent an edge or a lip on the top 42.

Optionally, an aperture 49 may be placed in the bottom 45 of the dispensing tray 40 and a conduit 48 may be operatively connected to the aperture 49 to facilitate dispensing of the solid product tablet directly into a container such as a mop bucket or a warewashing machine. This is shown in FIG. 1. Using a conduit 48 would enable one to dispense and use the product tablet without necessitating handling of the product tablet.

When the components of the dispenser 10 are assembled, the back plate 30 and the dispensing tray 40 are operatively connected to one another and the housing 11 envelopes the back plate 30 and also covers the top 42 of the dispensing tray 40. The first side 32 of the back plate 30 is attached to the first side 43 and the second side 33 is attached to the second side 44 thereby forming a cavity or a space between the back plate 30 and the dispensing tray 40. The space between the back plate 30 and the dispensing tray 40 is adequate to allow the solid product tablet to be dispensed therethrough. These sides may be welded, bolted, or otherwise attached by means known in the art. In addition, the back portion 41 of the dispensing tray 40 may be attached to a surface such as a wall with double back tape or other attaching means well known in the art thereby providing means for the dispenser 10 to be mounted to the surface for readily accessible product dispensing. The housing 11 is preferably bolted or otherwise attached by means well known in the art to the dispensing tray 40 proximate the top 13 and the bottom 14 on the first side 15 and the second side 16 of the housing 11. Bolts or other attachment means known in the art (not shown) are inserted through holes 15a and 43a and through holes 16a and 44a to attach the bottom of housing 11 to the dispensing tray 40 and to provide a pivot point proximate the bottom of the housing 11. Further, a locking device (not shown) is inserted through holes 16b and 44b to secure the top of housing 11 to the dispensing tray 40 and to prevent theft of the blister pack 25. In the preferred embodiment, a key lock is preferably used, but any locking device known in the art may be used to secure the housing 11 onto the dispensing tray 40. Optionally, it is understood that the bolts or other attachment means may be placed proximate the top of housing 11 and the locking device may be placed proximate the bottom of housing 11.

In operation, the blister pack 25 is placed between the housing 11 and the back plate 30 so that the compartments 27 protrude through the apertures 19 of the housing 11 and the backing 28 contacts the front 31 of the back plate 30. The compartments 27 not only extend through the apertures 19 but the openings 27a of the compartments 27 align with the apertures 34 of the back plate 30. Alignment and tight fit of the dispenser 10 are important to ensure that the backing 28 ruptures easily and appropriately when dispensing a product tablet. The backing 28 will not rupture prematurely when the dispenser 10 is assembled because pressure must be exerted upon the backing 28 against the puncture tab 35 to initiate tearing of the backing 28.

When a product tablet is to be dispensed, pressure must be placed on the top portion of the compartment 27 above the cup member 18. The bottom portion of the compartment 27 is protected by the cup member 18 so the top portion of the compartment 27 must be pushed to push the product tablet against the backing 28 thereby bringing the backing 28 into contact with the puncture tab 35. When the backing 28 is pushed against the puncture tab 35 by the product tablet, the backing 28 ruptures and the product tablet falls out of the opening 27a of the compartment 27 into the cavity located between the back plate 30 and the dispensing tray 40. Because of the large surface area of the product tablet, it is difficult to push the tablet through the backing 28 of the blister pack 25 without the puncture tab 35. It has been found that placing the puncture tab 35 proximate the top of the aperture 34 works best because an adequate clearance exists between the product tablet and the puncture tab 35. It may also work for the puncture tab 35 to be located on the side of the aperture 34 if there is adequate clearance between the puncture tab 35 and the side of the product tablet. It would not work well for the puncture tab 35 to be located on the bottom of the aperture 34 because it would likely interfere with the product tablet and gouge the bottom of the product tablet thereby preventing the proper dose of product from being utilized. In the preferred embodiment, the product tablet has a first size of approximately 1.250 inches and the compartment 27 has a second size of approximately 1.500 inches. Therefore, a clearance of at least 0.250 inch between the product tablet and the compartment 27 ensures that the product tablet will not be damaged by the puncture tab 35, which extends into the aperture 34 approximately 0.125 inch, which is a distance less than the clearance. Again, these dimensions may be smaller or larger depending upon the size of the product tablet used with the dispenser. The puncture tab 35 will not pierce or rupture the backing 28 prematurely to expose the tablets without pressure being exerted upon it. The individual blisters or compartments 27 are displayed through the apertures 19 in the housing 11 and when the tops of the compartments 27 are pushed the product tablet exerts pressure on the backing 28 and then the backing 28 is ruptured by the puncture tab 35. This ensures that the puncture tab 35 sufficiently initiates the tear in the backing 28 of the blister pack 25 near the top of the opening 27a of the compartment 27. The compartment 27 becomes depressed from the pressure and the product tablet is pushed against the backing 28 and through the opening 27a of the compartment 27 and the backing 28 tears from the top down as the tablet is pushed therethrough. The product tablet then enters the cavity between the back plate 30 and the dispensing tray 40 and falls downward to the bottom 45 of the dispensing tray 40. The receptacle 17 of the housing 11 prevents the product tablet from falling out of the dispenser 10 while the opening 21 of the receptacle 17 allows access into the cavity to easily acquire the product tablet.

When all of the solid product tablets have been dispensed from the blister pack 25, the locking device proximate the top 13 of housing 11 may be unlocked and the housing 11 may be pivoted on the bolts proximate the bottom 14 in a downward direction to remove the spent blister pack 25 and replace it with a full blister pack 25. Then the housing 11 may be pivoted back in an upward direction and the locking device may be replaced to secure the dispenser.

In the preferred embodiment, the product tablets are a unique product form using extrusion technology. The product is cut into the product tablets and then a product tablet is placed in each of the compartments 27 of the blister pack 25. It is understood that other forms of product tablets known in the art may be used including pressed product tablets. This type of packaging is especially useful for unit dose of products in solid form for commercial applications. To be most effective in commercial applications, the product tablets should be designed to dissolve quickly but because the tablets dissolve quickly they may be very sensitive to moisture and must have packaging that keeps the product dry. Thus, the blister packaging is ideal for commercial applications. In addition, the blister packaging ensures that the appropriate dose of product is used by preventing the use of too much product since each dose is predetermined. Further, the differentiated packaging is also as pilfer proof as possible because it is not small and would be more difficult to steal. This also provides low cost packaging that protects the individual doses from the environment until the dose is used and provides high speed packaging capability.

Further, the dispenser 10 is a low cost, wall mounted dispensing system that is easy to install and requires no electricity or plumbing. The product usage can be very easily monitored by simply viewing the compartments 27 protruding through the apertures 19 to see how many compartments 27 contain product tablets. Optionally, a portion may be cut out of the housing 11 to provide a window 20 through which a label on the blister pack 25 indicating the particular product being dispensed is shown. Further, the cup members 18 of the dispenser 10 could be labeled with days of the week, the month, or whatever is suitable for the particular product application to provide appropriate dosage guidelines. Labeling would help ensure proper product usage, prevent using too much product, and prevent theft of the product because product usage could be more easily monitored. Products that could be used in the dispenser 10 include cleaning products for pots and pans, floors using a mop bucket, pre-soak, all purpose/multi-surface cleaning, sanitizing, bar washing, and machine warewashing. Possible other uses for the present invention include mini blister packs for products used with spray bottles, unit dose hand soap pellets, unit dose in drains or tanks or any other vessel, sanitizing pellets, chlorine dioxide packs for ice machines, insect bait, home dish machines, and toilets.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A dispenser for dispensing a solid product tablet having a first size, comprising:
   a. a blister pack having a compartment containing the solid product tablet, said compartment having a top portion, a bottom portion, an opening, and a second size, wherein said second size is larger than the first size of the solid product tablet;
   b. a housing having a cup member and a first aperture, said cup member cupping a lower portion of said first aperture, said compartment being configured and arranged to protrude through said first aperture, said cup member protecting said bottom portion of said compartment and allowing access to said top portion of said compartment;
   c. a back plate having a second aperture and a puncture tab, said back plate being configured and arranged to fit within said housing, said second aperture being in alignment with said first aperture, said puncture tab extending from said back plate into said second aperture, wherein said blister pack is positioned between said housing and said back plate; and
   d. a tray having a bottom, said tray being operatively connected to said back plate, wherein said tray allows the solid product tablet to be dispensed through said second aperture and proximate said bottom of said tray.

2. The dispenser of claim 1, further comprising a conduit, said conduit operatively connected to said bottom of said tray wherein said solid product tablet is dispensed therethrough.

3. The dispenser of claim 1, wherein said puncture tab is positioned on said back plate proximate said top portion of said compartment.

4. The dispenser of claim 1, further comprising a clearance between said first size and said second size, wherein said puncture tab extends into said second aperture a distance less than said clearance.

5. A method of dispensing a solid product tablet having a first size, comprising:
   a. placing a blister pack having a backing and a compartment containing the solid product tablet between a housing and a back plate, said compartment having a top portion, a bottom portion, an opening, and a second size, said backing sealing said opening of said compartment, wherein said second size is larger than the first size of the solid product tablet, said housing having a cup member and a first aperture, said cup member cupping a lower portion of said first aperture, said compartment protruding through said first aperture, said cup member protecting said bottom portion of said compartment and allowing access to said top portion of said compartment, said back plate having a second aperture and a puncture tab, said back plate fitting within said housing, said second aperture being in alignment with said first aperture, said puncture tab extending from said back plate into said second aperture, wherein said blister pack is positioned between said housing and said back plate, a tray having a bottom and being operatively connected to said back plate, wherein said tray allows the solid product tablet to be dispensed proximate said bottom of said tray; and b. pushing on said top portion of said compartment, wherein said puncture tab pierces said backing of said blister pack thereby allowing the solid product tablet to exit said compartment through said opening and said second aperture, wherein the solid product tablet falls to said bottom of said tray.

6. The method of claim 5, further comprising taking the solid product tablet from said bottom of said tray.

7. The method of claim 5, wherein said puncture tab is positioned on said back plate proximate said top portion of said compartment.

8. A dispenser for dispensing a solid product tablet having a first size from a blister pack having a compartment containing the solid product tablet, the compartment having a top portion, a bottom portion, and a second size, wherein the second size is larger than the first size of the solid product tablet, comprising:

a. a housing having a cup member and a first aperture, said first aperture being configured and arranged to accommodate the compartment of the blister pack, said cup member protecting the bottom portion of the compartment and allowing access to the top portion of the compartment;

b. a back plate having a second aperture and a puncture tab, said back plate fitting within said housing, wherein the blister pack is positioned between said housing and said back plate, said puncture tab extending from said back plate into said second aperture; and c. a tray having a bottom, said tray being operatively connected to said back plate, wherein said tray allows the solid product tablet to be dispensed proximate said bottom of said tray.

9. The dispenser of claim 8, wherein said puncture tab is positioned on said back plate proximate said top portion of said compartment.

10. A dispenser for dispensing a solid product tablet having a first size from a blister pack having a compartment containing the solid product tablet, the compartment having a top portion, a bottom portion, and a second size, wherein the second size is larger than the first size of the solid product tablet, comprising:

a. a housing having a cup member and a first aperture, said cup member cupping a lower portion of said first aperture, said compartment being configured and arranged to protrude through said first aperture, said cup member protecting said bottom portion of said compartment and allowing access to said top portion of said compartment;

b. a back plate having a second aperture, said back plate being configured and arranged to fit within said housing, said second aperture being in alignment with said first aperture, wherein said blister pack is positioned between said housing and said back plate; and c. a puncture tab, said puncture tab extending from said back plate into said second aperture.

11. The dispenser of claim 10, further comprising a dispensing tray, said dispensing tray having a bottom and being operatively connected to said back plate, wherein said dispensing tray allows the solid product tablet to be dispensed proximate said bottom of said dispensing tray.

12. The dispenser of claim 10, wherein said puncture tab is positioned on said back plate proximate said top portion of said compartment.

13. A dispenser for dispensing a solid product tablet having a first size, comprising:

a. a blister pack having a compartment containing the solid product tablet, the compartment having a top portion, a bottom portion, and a second size, wherein the second size is larger than the first size of the solid product tablet;

b. a housing having a cup member and a first aperture, said cup member cupping a lower portion of said first aperture, said compartment being configured and arranged to protrude through said first aperture, said cup member protecting said bottom portion of said compartment and allowing access to said top portion of said compartment;

c. a back plate having a second aperture, said back plate being configured and arranged to fit within said housing, said second aperture being in alignment with said first aperture, wherein said blister pack is positioned between said housing and said back plate;

d. a puncture tab, said puncture tab extending from said back plate into said second aperture; and e. a tray having a bottom, said tray being operatively connected to said back plate, wherein said tray allows the solid product tablet to be dispensed proximate said bottom of said tray.

14. The dispenser of claim 13, wherein said puncture tab is positioned on said back plate proximate said top portion of said compartment.

* * * * *